May 6, 1947.　　　A. E. BELZUNG　　　2,419,941
CENTER GAGE FOR THREADING TOOLS
Filed Aug. 23, 1944

Inventor
Alexander E. Belzung,
By W Glenn Jones
Attorney

Patented May 6, 1947

2,419,941

UNITED STATES PATENT OFFICE 2,419,941

CENTER GAGE FOR THREADING TOOLS

Alexander Emil Belzung, San Diego, Calif.

Application August 23, 1944, Serial No. 550,816

3 Claims. (Cl. 33—89)

(Granted under the act of March 3, 1883, as amended April 30, 1928; 370 O. G. 757)

My invention relates broadly to a center gage and more specifically to a gage by which accurate setting up of threading tools for precision thread-cutting on engine lathes may be accomplished.

It is an object of the invention to provide a gage for setting regular turning tools and cut-off tools as well as thread-cutting tools for exact centering of the tools of the respective kinds with respect to the work, and in the case of a cutting-off tool, an alignment of the latter with the direction of the intended cut.

Another object of the invention is to provide a gage, desirably but not necessarily fixedly embodying a spirit level by means of which the gage is leveled on the work after temporary positioning thereof on the work in a lathe, for an immediately subsequent use of the gage as a guide in setting the cutting tool whatever its type.

A further object of the invention is to provide a gage of the character described that is cheaply and easily constructed, easy to adjust and efficient in operation.

With the above and other objects in view the invention consists in the construction, combination and arrangement of parts as will be described more fully hereinafter.

Reference is to be had to the accompanying drawings, forming a part of this specification, wherein like reference characters indicate corresponding parts throughout the several views, and in which.

Figure 1:
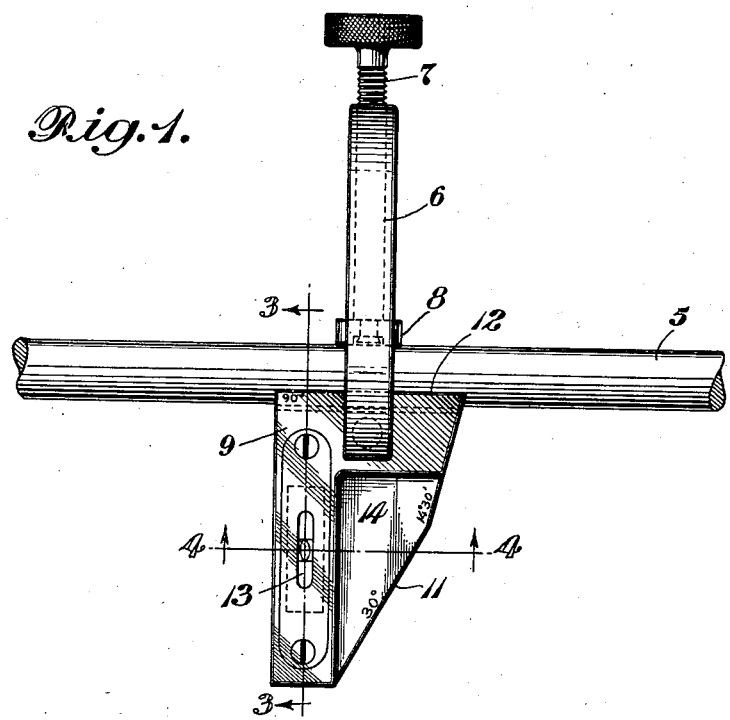
Fig. 1 is a top plan view of the gage applied to a piece of work.
Figure 2:
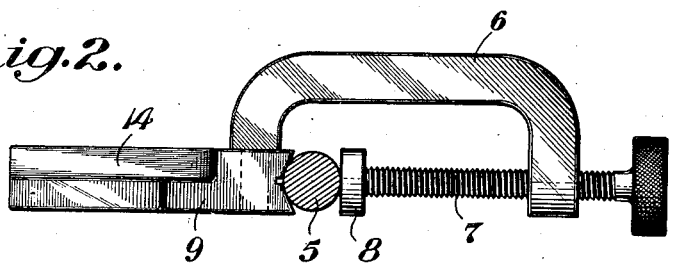
Fig. 2 is a side elevation of the gage, the mark being shown in section.

Heretofore it has been the practice in setting a tool for cutting a piece of work in a lathe, first to use a gage to locate the center line of the work so that it might be properly set up in the lathe and then to use another gage to set the cutting tool for a desired angle to cut. This dual operation has proven to be time consuming and apt to produce errors, particularly in precision cutting of threads when practiced by apprentices. By the gage now about to be described the above two operations are performed by but a single adjustment of a gage on the work with an attending reduction of possible errors.

Referring more particularly to the drawings, 5 indicates a piece of round work which is assumed to be gripped in the chuck of a lathe, and with respect to which a threading tool is adapted to be operatively set by means of the present invention. The center gage consists of a clamp by which it is adjustably and temporarily attached to the work when chucked in the lathe, a gage plate for determining the center line of the work and a spirit level for obtaining the proper adjustment of the center gage with respect to the work.

The clamp is of the usual construction, consisting of a U-member 6 through one leg of which a screw 7 operates to clamp the gage 9 upon the piece of work between a button 8 mounted on one end of the screw, and one straight side of the gage plate which is attached to the other leg of the U-member in any desirable manner.

Two sides of the gage plate meet to form a right angle, while the third side is shaped to form one or more angles of different degrees with respect to the center line of the plate. The left or second side which is disposed perpendicularly to the work is used in positioning a cutting-off tool. Each of the angles of the third side is so arranged that a threading tool when placed against it, will be in position to cut threads of a desired type. In the drawings this side 11 of the plate is shown as having angularities of 14½ degrees and 30 degrees, respectively to guide the operator in aligning a threading tool to cut Acme threads of 29 degrees or Standard V-threads of 60 degrees depending on which of the angularities is used. Of course it will be understood that these particular angles are merely illustrative, as other desired angles may be availed of.

Figure 3:
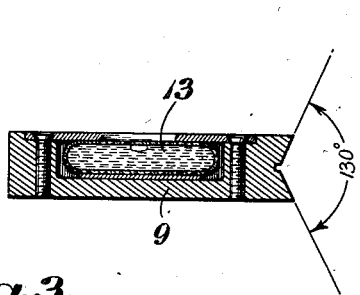
Fig. 3 is a sectional view taken on the line 3—3 of Fig. 1.
Figure 4:
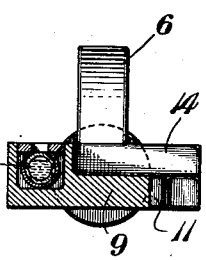
Fig. 4 is a sectional view taken on the line 4—4 of Fig. 1.

In order that the gage may be properly centered along the work, the foregoing one straight side 12 of the plate is provided with a V-cut or notch extending throughout its length, more clearly seen in Fig. 3, and into which the work is seated when the gage is applied. When the work is properly seated in the V-notch, the gage will be ready for adjustment to the necessary horizontal position from which the altitude setting of the threading tool is made. To this end one of the lateral faces of the gage is recessed at 14 to establish a depressed plane surface which is precisely in line with the center of the V-notch to aid in centering the thread cutting tool as presently explained. In cutting precision threads it is necessary that the gage be level with the work, and to obtain this assurance a spirit level 13 is attached to the gage in such relationship to the plane surface of the recess 14 as to indicate when said surface is horizontally disposed with reference to the center line of the work. Should it be desired to omit the attachment of the level, a separate, pocket-size level may be seated on the plane surface of the recess 14 during the gage-leveling act, and then removed. But in any event the spirit level is essential to the use of the gage because without it the plane leveling surface of the recess could only by chance be brought into horizontal alignment with the axial center of the work.

As previously stated the gage is particularly adapted for use with round work, although not limited to such. In use it is so placed on the work that the V-notch will embrace the work. The uppermost plane surface of the recess 14 will coincide with the plane of the axial center of the work, said surface radiating from the axial center regardless of the initial position of the gage. The gage is next levelled by the spirit level, after which it is tightened to the work by the clamp, the uppermost surface of the recess then standing perfectly horizontal and centered on the axis of the work. Assuming that a thread cutting tool has been clamped in the tool post (neither tool nor post shown), the operator manipulates the tool post up or down, forward or backward until the tool lies against and parallel to the chosen angle of the side 11, and the cutting point of the tool is flush with the surface 14. The tool is then in the correct cutting position and needs only to be advanced into contact with the work for the commencement of the cutting operation, preparatory to which the gage is removed.

It will be understood that the above description and accompanying drawings comprehend only the general and preferred embodiment of the invention and that various changes in details of construction, proportion and arrangement of parts may be made within the scope of the appended claims and without sacrificing any of the advantages of the invention.

The invention described herein may be manufactured and used by or for the Government of the United States for governmental purposes without the payment to me of any royalty thereon.

What is claimed is:

1. A gage for aiding in centering a thread cutting tool with respect to the axis of a cylindrical piece of work, said gage comprising a plate with a V-notch and clamp means, respectively, for temporarily receiving and affixing the plate to the work, one of the sides of the plate being so formed as to establish a predetermined angle with respect to the work, a portion of the plate being recessed adjacent to said one side to provide a plane surface lying in the plane of the center of the V-notch.

2. A gage for aiding in centering a thread cutting tool with respect to the axis of a cylindrical piece of work, said gage comprising a plate having a contiguous pair of sides at mutual right angles, one of the sides having a V-notch longitudinally thereof to receive the work, and means carried by the plate at said side for temporarily affixing the plate to the work, a third side of the plate having at least one angularity so formed as to establish a predetermined angle with respect to the work, a portion of the plate being recessed adjacent to the angularity to provide a plane surface lying in the plane of the center of the V-notch, and a level so carried by the plate and so related to the plane surface as to indicate when said surface is horizontally disposed with reference to the center line of the work.

3. A gage for aiding in centering a thread cutting tool with respect to the axis of a cylindrical piece or work, said gage comprising a plate having lateral faces and a contiguous pair of sides at mutual right angles, one of the sides having a V-notch longitudinally thereof to receive the work, the other side having a cavity, a spirit level sequestered in the cavity but visible for inspection at one of the lateral faces, clamp means carried by the plate at said one side for temporarily affixing the plate to the work, said one lateral face being recessed in the plate to provide a surface in a plane at a depth coincident with the center plane of the V-notch, and a third side of the plate having at least one angularity contiguous to the recessed surface for use in setting the cutting pitch of the tool.

ALEXANDER EMIL BELZUNG.

REFERENCES CITED

The following references are of record in the file of this patent:

UNITED STATES PATENTS

| Number | Name | Date |
| --- | --- | --- |
| 1,171,329 | Early | Feb. 8, 1916 |
| 1,845,449 | Smith | Feb. 16, 1932 |
| 548,329 | Stemmerich | Oct. 22, 1895 |
| 450,457 | Green | Apr. 14, 1891 |
| 625,019 | Cardell | May 16, 1899 |
| 1,284,879 | Donaldson | Nov. 12, 1918 |
| 1,585,490 | Hainsworth | May 18, 1926 |

FOREIGN PATENTS

| Number | Country | Date |
| --- | --- | --- |
| 8,406 | British | 1891 |